(12) United States Patent
Geiler et al.

(10) Patent No.: US 10,213,920 B2
(45) Date of Patent: Feb. 26, 2019

(54) APPARATUS AND METHOD FOR MONITORING A PAYLOAD HANDLING ROBOT ASSEMBLY

(71) Applicant: KUKA Deutschland GmbH, Augsburg (DE)

(72) Inventors: Torsten Geiler, Augsburg (DE); Florian Steigenberger, Gersthofen (DE); Frank Roland, Augsburg (DE); Uwe Bonin, Friedberg (DE); Richard Rudolf, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 14/339,102

(22) Filed: Jul. 23, 2014

(65) Prior Publication Data

US 2015/0032261 A1     Jan. 29, 2015

(30) Foreign Application Priority Data

Jul. 26, 2013    (DE) ........................ 10 2013 012 446

(51) Int. Cl.
     *G05B 15/00*      (2006.01)
     *G05B 19/00*      (2006.01)
     *B25J 9/16*      (2006.01)

(52) U.S. Cl.
     CPC ............. *B25J 9/16* (2013.01); *B25J 9/1676* (2013.01); *G05B 2219/49146* (2013.01); *G05B 2219/49304* (2013.01); *G05B 2219/50204* (2013.01)

(58) Field of Classification Search
     CPC ......... B25J 9/1676; G05B 2219/49146; G05B 2219/49304; G05B 2219/50204

(Continued)

(56) References Cited

U.S. PATENT DOCUMENTS 5,711,697 A * 1/1998 Taninaga ................ B24B 27/04
     318/560
6,247,999 B1 * 6/2001 Tokiwa ................... B24B 19/20
     451/57

(Continued)

FOREIGN PATENT DOCUMENTS

| CN | 102717286 A | 10/2012 |
|---|---|---|
| DE | 19581677 T1 | 5/1997 |

(Continued)

OTHER PUBLICATIONS

European Patent Office; Search Report in European Patent Application No. 14002390.4 dated Oct. 26, 2015; 7 pages.

(Continued)

*Primary Examiner* — Harry Y Oh
(74) *Attorney, Agent, or Firm* — Dorton & Willis, LLP

(57) ABSTRACT

A method for monitoring a payload-handling robot assembly having at least one robot includes identifying a robot-handled payload arrangement on the basis of a current position of the robot assembly relative to a specified change position of the robot assembly. In another aspect, a robot assembly includes at least one robot, a monitoring apparatus configured to determine a current position of the robot assembly and to identify a robot-handled payload arrangement on the basis of the current position of the robot assembly relative to a specified change position of the robot assembly, and a payload receptacle for receiving a plurality of different payloads. The robot is configured for handling the plurality of payloads in an alternating manner.

12 Claims, 1 Drawing Sheet

(58) Field of Classification Search
USPC .......................................................... 700/258
See application file for complete search history.

(56) References Cited

U.S. PATENT DOCUMENTS

| | | | | |
|---|---|---|---|---|
| 2007/0276538 | A1* | 11/2007 | Kjellsson | B25J 19/0025 |
| | | | | 700/245 |
| 2009/0198379 | A1* | 8/2009 | Komuro | B25J 9/1674 |
| | | | | 700/250 |
| 2011/0184558 | A1* | 7/2011 | Jacob | B25J 9/1676 |
| | | | | 700/259 |
| 2013/0178980 | A1* | 7/2013 | Chemouny | B25J 9/1671 |
| | | | | 700/255 |
| 2013/0245823 | A1* | 9/2013 | Kimura | B25J 5/02 |
| | | | | 700/248 |
| 2013/0277344 | A1* | 10/2013 | Guymon | B23K 5/18 |
| | | | | 219/125.1 |
| 2014/0287897 | A1* | 9/2014 | George | B23Q 3/15513 |
| | | | | 483/1 |

FOREIGN PATENT DOCUMENTS

| | | |
|---|---|---|
| EP | 2087967 A2 | 8/2009 |
| JP | 5088156 B2 | 12/2012 |
| KR | 0126130 | 12/1998 |
| KR | 20120083984 A | 7/2012 |
| KR | 20120110055 A | 10/2012 |
| WO | 2006117022 A1 | 11/2006 |

OTHER PUBLICATIONS

German Patent Office; Search Report in German Patent Application No. 10 2013 012 446.8 dated Jul. 8, 2014; 10 pages.
Korean Patent Office; Office Action in Korean Patent Application No. 2014-0093819 dated Jan. 26, 2016; 10 pages.
Korean Patent Office; Office Action in Korean Patent Application No. 2014-0093819 dated Sep. 28, 2016; 9 pages.
Korean Patent Office; Office Action in Korean Patent Application No. 2014-0093819 dated Jul. 29, 2016; 7 pages.
Korean Patent Office; Office Action in Chinese Patent Application No. 201410362536.8 dated Dec. 29, 2016; 19 pages.

* cited by examiner

APPARATUS AND METHOD FOR MONITORING A PAYLOAD HANDLING ROBOT ASSEMBLY

TECHNICAL FIELD

The present invention relates to a method and a monitoring means for monitoring a payload-handling robot assembly, a robot assembly comprising such a monitoring means as well as a computer program product for carrying out such a method.

BACKGROUND

In order to increase the productivity, robots can carry different payloads. For example, a robot can carry a variety of tools in an alternating manner; and for this purpose said robot can put down a tool that is no longer needed and can pick up a new tool. That is, said robot can change tools.

In this case it is necessary to know the tool that is currently being handled, in particular, in order to consider its contours during a collision monitoring operation. According to in-house practice, special tool sensors have been used to date for this purpose. With these tool sensors it is possible to identify accurately and reliably the tool that is currently handled by the robot. The drawback with these sensors is that each tool has to have at least one dedicated sensor.

SUMMARY

The object of the present invention is to improve the operation of a robot assembly.

According to one aspect of the present invention, a payload arrangement that is handled by a robot is identified on the basis of a current position of a robot assembly relative to a specified change position of this robot assembly.

This aspect of the present invention is based on the idea that robots have to move to a specific change position, in order to change the payload. Correspondingly it can be assumed that after having moved to the respective change position, the payload that is associated with this change position has been picked up by the robot assembly and will now be handled by said robot assembly. Correspondingly the new payload can be identified on the basis of the current position of the robot assembly relative to a specified change position. In one embodiment this strategy can reduce the number of tool sensors in an advantageous way; in a further development it is possible to dispense with these tool sensors altogether. As an alternative, each payload can be provided with a maximum of one, in particular, inaccurate payload sensor, which, however, can provide in combination with a payload identification on the basis of a change position an accurate payload identification. This feature makes it possible to reduce, in particular, the complexity and/or the failure probability of a monitoring system based on an identified payload.

A payload can be, as explained in the introductory part, in particular, a tool. In addition or as an alternative, a payload can also be a workpiece and/or a component. Therefore, for a more concise presentation the tools and the workpieces can be referred to collectively as the payload.

In one embodiment the robot assembly comprises at least one, in particular, exactly a single robot or a plurality of robots, in particular, industrial robots. In one embodiment at least one robot, preferably all of the robots of the robot assembly are configured for handling in an alternating manner a variety of tools and/or workpieces. In particular, one or more robots can comprise in each instance a payload attachment, for example, a tool gripper or more specifically a tool coupling.

In one embodiment the robot assembly comprises a receptacle, in particular, a stationary receptacle for receiving and/or storing and/or depositing various tools and/or workpieces in different payload storage positions; in particular, this receptacle is a tool change station.

A position for the purpose of the present invention can include, in particular, can be, in particular, a pose of one or more robots of the robot assembly. In one embodiment a position can have one or more, in particular, all of the joint coordinates of one or more robots of the robot assembly.

In addition or as an alternative, one embodiment provides that a position, as defined for the purpose of the present invention, may comprise, in particular, may be a one, two, or three dimensional position, described, for example, by Cartesian, cylindrical or polar coordinates, and/or a one, two or three dimensional orientation, described, for example, by Euler or Cardan angles, of a robot-fixed reference of one or more robots of the robot assembly. In one embodiment the position comprises, in particular, is the position and/or the orientation of the tool reference point ("tool center point", TCP) of one or more robots of the robot assembly.

In one embodiment the robot assembly is moved to one payload or to different payloads, which are stored or more specifically placed in various payload storage positions, for example, manually during the setup of the robot assembly or virtually in a simulation. Similarly it is also possible to move the payload-handling robot assembly to the empty payload storage positions. That is, a payload, which is handled by a robot, can be positioned in its payload storage position. Similarly it is also possible to move a robot assembly without a payload to a payload storage position; and/or it is possible to move to a payload storage position without a payload that is handled by a robot. That is, it is possible to position only virtually a payload in its payload storage position.

On the basis of a position of the robot assembly, in which the robot assembly has moved to a payload storage position, in particular, without a payload has moved to a payload, which is stored in a payload storage position, or with a payload has moved to a free payload storage position, one embodiment provides that this payload and/or this payload storage position is and/or are assigned a change position; and/or a change position, which is assigned to the payload, which is associated with this payload storage position, is predetermined, in particular, is saved on the basis of the position of the robot assembly. In this case preferably different payloads will be and/or are assigned different change positions. As a result, a robot-handled payload can be moved to a payload storage position; and/or the robot assembly without a payload can be moved to a payload in a payload storage position. In this case a change position, which is assigned to this payload, can be predetermined, in particular, can be saved, on the basis of the position that is assumed by the robot assembly.

In particular, at least in essence the position itself, in which the robot assembly has moved to the payload, for example, the position and/or orientation of the TCP of a robot, can be specified as the change position, if the robot has moved to a tool to be picked up or has moved with a tool to the payload receptacle, in order to deposit this tool. Similarly the change position can be defined in such a way that said change position is offset in relation to this position, in which the robot assembly has moved to the payload, in particular, on the basis of a maximum amount of the payload contour. In the event that, as explained below, initially, when a robot without a payload moves to a new payload that is to be picked up, a payload, which had been previously handled and has been put down in the meantime, continues to be identified, then this situation can initiate a collision monitoring of the payload, which continues to be identified, with the payload receptacle, to which said robot moved. In order to avoid this situation, one embodiment provides that the change position can be offset accordingly.

In one embodiment a payload is identified as a robot-handled payload arrangement, when a deviation between the current position of the robot assembly and a change position, which is assigned to this payload, falls below a specified limit value. This limit value can be fixed or variable; in one embodiment it can be identical for all payloads and/or for all change positions or can also be specified individually and/or can be specified specifically with respect to the change position.

The deviation and/or the limit value can be one dimensional or multi-dimensional. If a position r is defined, for example, by six dimensions owing to a three dimensional position x, y, z and a three dimensional orientation alpha, beta, gamma of the TCP (r=(x, y z, alpha, beta, gamma)), then the deviation $\Delta$ (delta) between the current position r and the change position $r_w$ can be defined, for example, by a norm, for example, a one dimensional norm or a maximum norm $\Delta=|r-r_w|$ and/or $\Delta=\text{MAX} \{x-x_w, y-y_w, z-z_w, \text{alpha}-\text{alpha}_w, \text{beta}-\text{beta}_w, \text{gamma}-\text{gamma}_w\}$ or also by multiple dimensions for each component $\Delta=(x-x_w, y-y_w, z-z_w, \text{alpha}-\text{alpha}_w, \text{beta}-\text{beta}_w, \text{gamma}-\text{gamma}_w)$.

In addition or as an alternative to a sufficient approximation of a change position, an actuation of the robot assembly can also be considered; in particular, it is possible to determine a payload change on the basis of an actuation of the robot assembly, in particular, a contact force and/or an operation, in particular, an opening and/or closing, of a payload attachment, for example, a tool gripper or more specifically a tool coupling. One embodiment provides that in order to identify a (new) payload, a deviation between the current position of the robot assembly and a change position, assigned to this payload, has to drop below the specified limit value in the course of an actuation, in particular, while opening and/or closing a payload attachment of the robot assembly and/or at the time between the opening and closing. If, for example, a robot moves to a change position without finally closing a tool gripper, then no new tool is identified.

In one embodiment a robot-handled payload arrangement is identified on the basis of a current position of the robot assembly relative to a specified change position of the robot assembly during a payload change. In particular, a payload is identified as a robot-handled payload arrangement, when during a payload change a deviation between the current position of the robot assembly and a change position, which is assigned to this payload, falls below a specified limit value. In this case a payload change can be determined, in particular, on the basis of an actuation of the robot assembly, for example, as explained above, on the basis of operating a payload attachment of the robot assembly, for example, a tool coupling. Similarly a current position of the robot assembly can also be determined continuously, in particular, periodically and/or at specified time intervals and can be compared with one or more specified change positions. In this case a payload is identified as a (new) robot-handled payload arrangement, as soon as a deviation between the current position of the robot assembly and a change position, assigned to this payload, drops below a specified limit value.

In one embodiment one payload arrangement with at least one payload will be and/or is always identified as a robot-handled payload arrangement at least during a movement of the robot assembly, preferably during the complete operation. This approach makes it possible in one embodiment to improve, in particular, the reliability of a collision monitoring system.

In particular, for this purpose it is possible in one embodiment that an identified robot-handled payload arrangement can be replaced, in particular, only, or more specifically exclusively, by a new identified payload arrangement. If a payload is unintentionally not uncoupled, then this payload shall continue to be identified as the robot-handled payload, in particular, in order to guarantee a correct collision monitoring process. This feature can be achieved, in particular, by the fact that the identified payload can be replaced only by a new identified payload arrangement.

For this purpose one embodiment provides that each payload arrangement that can be identified has at least one payload. Similarly it is possible to provide an identifiable payload arrangement that does not have a payload, in order to be able to monitor even an empty robot assembly or more specifically a robot assembly without a payload. If after depositing a payload the robot assembly moves, for example, to a predetermined empty change position, optionally subject to the actuation of its payload attachment, then this empty payload arrangement without a payload can be identified as a new robot-handled payload arrangement. That is, the empty robot assembly can be correctly monitored.

In addition or as an alternative, one embodiment provides that in one predetermined state of the robot assembly a payload arrangement with two or more payloads is identified as a robot-handled payload arrangement.

The predetermined state of the robot assembly can be, in particular, the start of operation or the start of movement. Even in the case of a payload, which was inadvertently coupled initially, a reliable collision monitoring can be carried out, in particular, at the start of a first tool change, due to the fact that, first of all, even in the case of a robot assembly without a payload, a payload arrangement with two or more payloads, in particular, with all of the payloads of the payload receptacle, for example, the tool change station, is identified fictitiously and is considered in a collision monitoring system. If a (first) payload change is carried out correctly, then the payload that has been picked up at the same time, is identified and replaces this fictitious payload arrangement.

In addition or as an alternative, the predetermined state of the robot assembly may be, in particular, a fault state, for example, after a payload loss, an unsuccessful uncoupling of a payload, a collision or the like. Even in the case of such a fault, a reliable collision monitoring can be carried out in that a payload arrangement with two or more payloads, in particular, with all of the payloads of the payload receptacle, in particular, the tool change station, is identified (again) fictitiously and is considered in a collision monitoring system. If (then) a payload change is correctly executed, the payload that was picked up at the same time is identified and replaces this fictitious payload arrangement.

Monitoring a payload-handling robot assembly with identification of a robot-handled payload arrangement can be carried out, in particular, for a collision. Correspondingly in one embodiment of the present invention the robot assembly is monitored for a collision on the basis of the respectively identified robot-handled payload arrangement, in that a contour, which is saved for the respectively identified payload arrangement, is considered during the collision monitoring operation. Similarly a monitoring of a payload-handling robot assembly with identification of a robot-handled payload arrangement can ensure, for example, that a permissible handling load and/or a specified tool or workpiece time is or are not exceeded or the like.

A monitoring means, according to one aspect of the present invention, can be designed in hardware and/or software. In particular, said monitoring means can comprise, a processing unit, which is connected preferably to a memory system and/or a bus system by means of data and/or signals, and is, in particular, a digital processing unit, in particular, a microprocessor unit (CPU), and/or can comprise one or more programs or program modules. For this purpose the CPU can be configured to execute commands, which are implemented as a program, which is stored in a memory system, to acquire input signals from a databus and/or to send output signals to a databus. A memory system can comprise one or more, in particular, different storage mediums, in particular, optical, magnetic, solid state and/or other non-volatile mediums. The program can be configured in such a way that it embodies or more specifically is capable of executing the method described herein, so that the CPU can carry out the steps of such a method and, as a result, can monitor, in particular, the robot assembly. A monitoring means can be implemented, in particular, in a control system or more specifically by means of a control system of the robot assembly.

In one embodiment the monitoring means is configured for determining a current position of the robot assembly, in particular, during a payload change. For this purpose said monitoring means can comprise, in particular, one or more sensors for detecting the joint coordinates of the robot assembly. In one embodiment the current position of the robot assembly during a payload change is determined reliably by means of the monitoring means or more specifically in a fail-safe technology, in particular, through redundancy, preferably diversity, for example, by means of two sensors each for detecting the same joint coordinates or the like.

According to one aspect of the present invention, a computer program product can be, in particular, a computer readable storage medium, for example, a data carrier, with a program code, by means of which a method, described herein, is carried out, when the program runs in a monitoring means, in particular, a control system, of a robot assembly.

Additional advantages and features will be apparent from the dependent claims and the exemplary embodiments. For this purpose the drawings show to some extent in schematic form the following.

DETAILED DESCRIPTION

Figure 1:
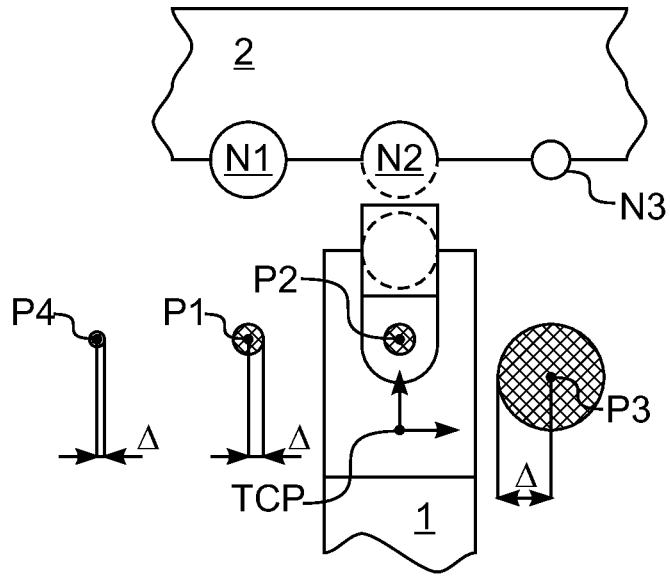
FIG. 1: a portion of a robot assembly according to one embodiment of the present invention.

FIG. 1 shows a portion of a robot 1, which is not handling a tool at this instance and is in the process of leaving or moving to a tool change station 2, which is designed to receive different tools N1 to N3. Tools N1, N2, N3, which are not being handled by the robot at the present time, are placed in the tool change station. A current position and orientation of the TCP of the robot is determined on the basis of a pose, which is detected by the joint sensors (not illustrated), by means of forward kinematics and is indicated by a coordinate system in FIG. 1.

Figure 2:
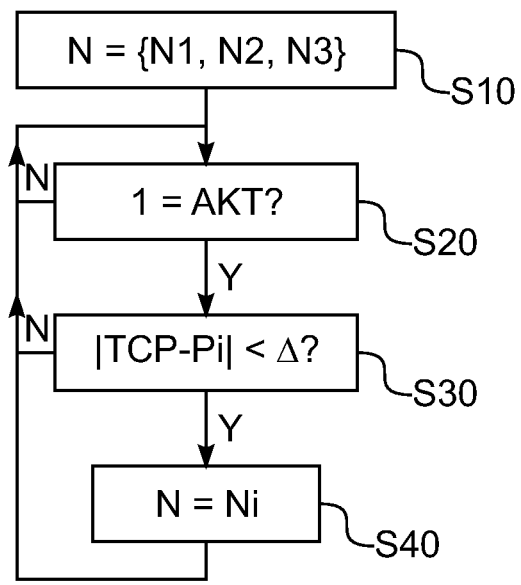
FIG. 2: a method for monitoring the robot assembly from FIG. 1 according to one embodiment of the present invention.

FIG. 2 shows a method for monitoring the robot assembly from FIG. 1 according to one embodiment of the present invention. In this case the monitoring sequence runs in a control system (not illustrated) of the robot 1.

At the start of the operation, a payload arrangement {N1, N2, N3} with all of the payloads of the tool change station 2 is identified as a robot-handled payload arrangement N in a step S10; and the robot 1 monitors for a collision on the basis of this identified robot-handled payload arrangement N={N1, N2, N3}.

During a first tool change the robot opens its tool gripper, moves to the corresponding tool, for example, the tool N2, closes its tool gripper and leaves the tool change station (cf. FIG. 1).

Based on this opening and closing of a tool gripper, a tool change is determined in a step S20 by checking whether the tool gripper has been opened and closed again (S20: "Y") or not (S20: "N").

If an opening and closing of the tool gripper is determined (S20: "Y"), then a deviation Δ (delta) between the current position of the TCP of the robot 1 and a specified change position Pi (i=1, 2, 3) is determined, in the example, the change position P2.

If this deviation Δ falls below a specified limit value (S30: "Y"), as is indicated with the cross hatching in FIG. 1, then the tool, assigned to this change position, in the example, the tool N2, is identified as the (new) payload arrangement N; and the robot 1 monitors for a collision on the basis of this identified robot-handled payload arrangement N=N2. Otherwise (S30: "N"), the initially identified robot-handled payload arrangement N={N1, N2, N3} shall continue to apply.

Then during a subsequent tool change the robot puts down the tool that it had been handling up to this point for example, the tool N2. In this case then the identified robot-handled payload arrangement N=N2 shall continue to apply.

Then the robot moves to the new tool, for example, the tool N1, in order to pick it up in the same way as described above. When an opening and closing of the tool gripper is determined (S20: "Y"), a deviation Δ (delta) between the position of the TCP and the specified change position P1 is determined.

If this deviation Δ (delta) falls below a specified limit value (S30: "Y"), then this tool N1, which is assigned to this change position, is identified as a new payload arrangement N; and the robot 1 monitors for a collision on the basis of this identified payload arrangement that is handled by the robot N=N1. Otherwise (S30: "N"), the identified payload arrangement that is handled by the robot N=N2 shall continue to apply.

This procedure makes it possible to ensure that the collision monitoring will continue to be reliable, even in the event that the tool N2 was not successfully uncoupled.

In order to be able to identify a robot without a tool in a consistent manner, a free or more specifically an empty change position P4, to which an empty payload arrangement without a payload (N-{ }) is assigned, continues to be provided. If after depositing a tool N1, N2 or N3, the robot 1 moves to this empty change position P4 and opens and closes its tool gripper (S20: "Y", S30: "Y") at said empty change position, then this empty payload arrangement N={ } is identified, so that from now on the empty, tool-less robot is correctly monitored for a collision, until said robot picks up again a tool; and this state is identified in the same way as described above.

In order to specify the different change positions P1 to P3, the empty robot 1 was moved initially to the different tools N1 to N3. Similarly it is also possible for the robot-handled tools N1, N2 and/or N3 to be moved to the storage positions in the tool change station 2.

The positions, in which the robot moved to the tools N1 and N2 and/or their storage positions, were saved directly as the change positions.

FIG. 1 shows by way of example a tool N3 with a smaller outside contour. If the position of the TCP of the robot 1 at a tool N3, to which the robot has moved, is defined as a change position and, in the course of moving to this tool, the robot was monitored for a collision during the normal operation until it reached this change position with one of the other, larger tools N1, N2 as the identified robot-handled payload arrangement N, then this collision monitoring was already initiated before it reached this change position. Therefore, in the exemplary embodiment the change position P3, assigned to the tool N3, is specified to be offset relative to the position, in which this tool N3 is approached, and, in particular, on the basis of the maximum tool contour, in the example, the contour of the tools N1 and N2. In addition, the specified limit value Δ (delta) for this change position is specified correspondingly larger. As an alternative, the collision monitoring could also be, for example, deactivated in the region of the change positions or more specifically the tool change station.

In a modification it is also possible to dispense with the step S20, so that whenever there is a move to one of the change positions P1 to P3 within the tolerance range defined by the limit value Δ (delta), the assigned tool N1, N2 and/or N3 is identified, i.e., even without determining a tool change.

The tolerance range Δ (delta) around the free change position P4 is defined smaller, in order to depict a higher accuracy for an identification of a robot without a tool.

While the present invention has been illustrated by the description of one or more embodiments thereof, and while the embodiments have been described in considerable detail, they are not intended to restrict or in any way limit the scope of the appended claims to such detail. The various features shown and discussed herein may be used alone or in combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

LIST OF REFERENCE NUMERALS AND SYMBOLS 1 robot
2 tool change station (payload receptacle)
N1, . . . , N3 tool (payload)
P1, . . . , P4 change position
TCP current position of the tool center point
Δ (delta) deviation

What is claimed is:

1. A method for monitoring a payload-handling robot assembly with at least one robot, the method comprising:
   determining the identity of a configuration of a robot-handled payload handled by the at least one robot based on a current position of the at least one robot relative to a specified change position of the at least one robot, the determining step performed by a control system of the robot assembly;
   wherein a payload change is determined by a deviation between a current position of a payload attachment and a change position of the payload attachment, and on the basis of an actuation to open or to close the payload attachment of the robot assembly to grip a new payload;
   moving the payload with the at least one robot;
   monitoring operation of the at least one robot based on the identified configuration of the robot-handled payload; and
   identifying a configuration of a payload as the configuration of a robot-handled payload when a deviation between the current position of the at least one robot and a change position associated with the configuration of a payload drops below a specified limit value.

2. The method of claim 1, wherein a payload change is determined on the basis of an actuation of the robot assembly.

3. The method of claim 1, further comprising replacing the identified configuration of a robot-handled payload with a new configuration of a robot-handled payload.

4. The method of claim 1, wherein, at least during a movement of the robot assembly:
   a configuration of a payload with at least one payload is always identified as the configuration of a robot-handled payload at least during a movement of the robot assembly; or
   wherein a configuration of a payload without a payload is provided as an identifiable configuration of a robot-handled payload.

5. The method of claim 1, wherein, in one predetermined state of the robot assembly, a configuration of a payload with a plurality of payloads is the identified configuration of a robot-handled payload.

6. The method of claim 1, further comprising:
   moving the at least one robot-to at least one payload storage position; and
   specifying a change position assigned to a configuration of a payload that is associated with the payload storage position on the basis of a position of the at least one robot, in which the at least one robot has moved to the payload storage position.

7. The method of claim 1, wherein different change positions are assigned to different configurations of a payload.

8. The method of claim 1, wherein monitoring operation of the at least one robot comprises monitoring the at least one robot-for collision on the basis of the identified configuration of a robot-handled payload.

9. An apparatus for monitoring a payload-handling robot assembly that includes at least one robot, the apparatus comprising monitoring means configured to determine a current position of the at least one robot and to determine the identity of a configuration of a robot-handled payload handled by the at least one robot based on the current position of the at least one robot relative to a specified change position of the at least one robot, wherein a payload change is determined by a deviation between a current position of a payload attachment and a change position of the payload attachment, and on the basis of an actuation to open or to close the payload attachment of the robot assembly to grip a new payload, wherein operation of the at least one robot is monitored based on the identified configuration of the robot-handled payload, wherein a configuration of a payload is identified as the configuration of a robot-handled payload when a deviation between the current position of the at least one robot and a change position associated with the configuration of a payload drops below a specified limit value.

10. A robot assembly, comprising:
   at least one robot; and
   a monitoring apparatus configured to:
      determine a current position of the robot;
      determine the identity of a configuration of a robot-handled payload handled by the at least one robot based on the current position of the at least one robot relative to a specified change position of the at least one robot, wherein a payload change is determined by a deviation between a current position of a payload attachment and a change position of the payload attachment, and on the basis of an actuation to open or to close the payload attachment of the robot assembly to grip a new payload;
      monitor operation of the at least one robot based on the identified configuration of the robot-handled payload; and
      identify a configuration of a payload as the configuration of a robot-handled payload when a deviation between the current position of the at least one robot and a change position associated with the configuration of a payload drops below a specified limit value.

11. A computer program product for monitoring a payload-handling robot assembly including at least one robot, the computer program product having programming code stored on a non-transitory machine readable data medium, the programming code configured to, when executed by a computer, cause the computer to:
   determine the identity of a configuration of a robot-handled payload handled by the at least one robot based on a current position of the at least one robot relative to a specified change position of the at least one robot, wherein a payload change is determined by a deviation between a current position of a payload attachment and a change position of the payload attachment, and on the basis of an actuation to open or to close the payload attachment of the robot assembly to grip a new payload;
   wherein operation of the at least one robot is monitored based on the identified configuration of the robot-handled payload; and
   identify a configuration of a payload as the configuration of a robot-handled payload when a deviation between the current position of the at least one robot and a change position associated with the configuration of a payload drops below a specified limit value.

12. The robot assembly of claim 10, further comprising:
   a payload receptacle for receiving a plurality of different payloads;
   wherein the at least one robot is configured for handling the plurality of payloads in an alternating manner.

* * * * *